Jan. 10, 1956   L. BERTELE   2,730,016
PHOTOGRAPHIC WIDE-ANGLE OBJECTIVE
Filed Sept. 3, 1953
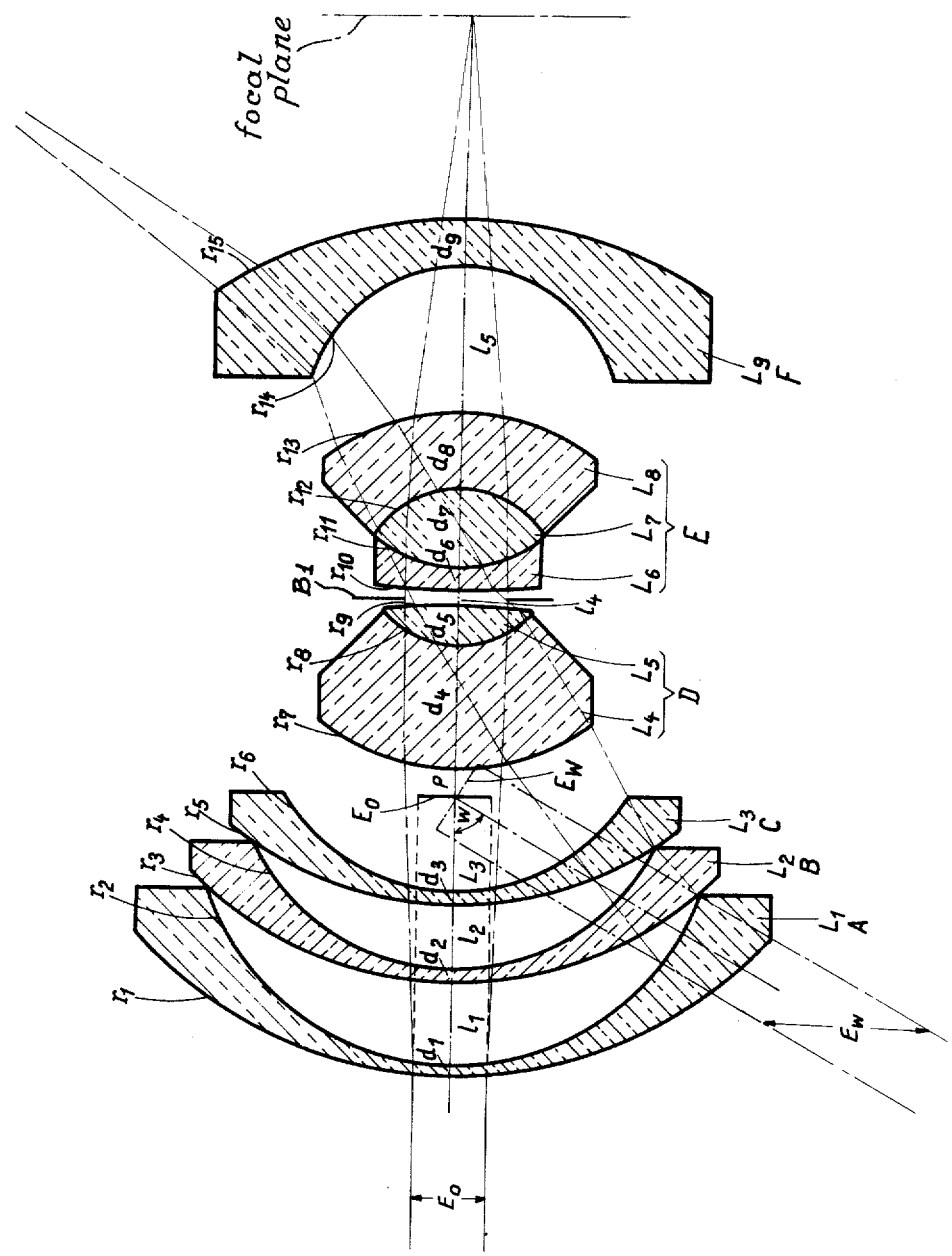

United States Patent Office 2,730,016
Patented Jan. 10, 1956

2,730,016
PHOTOGRAPHIC WIDE-ANGLE OBJECTIVE

Ludwig Bertele, Heerbrugg, Switzerland

Application September 3, 1953, Serial No. 378,306

Claims priority, application Switzerland September 8, 1952

3 Claims. (Cl. 88—57)

The subject of the invention is a wide angle objective consisting of two positive lens components and at least four negative lens components. The arrangement of the components is such that the two positive lens components are separated by the room for the diaphragm space and are bounded on the object side by at least three diverging meniscus components and on the image side by one diverging meniscus component. The air spaces between the diverging components on the object side have the form of converging menisci which turn their lesser curved side toward the iris diaphragm. This lens arrangement permits to establish an angular field of view up to 120°, and beyond, practically distortion free, with a lower vignetting of light than it can be expected on the grounds of Lambert's law, according to which the brightness of the image edges decreases with the 4th power of the cosine of the image angle.

For the image angle of ±60°, e. g., a maximum quantity of light of 6.25% relative to the center of the image would result if it is assumed that no vignetting whatsoever at the edges takes place. However, it has been found that upon special designing of the group of lenses in front of the iris diaphragm this small percentage can be increased if the image proportion "diameter of the entrance opening to diameter of the iris diaphragm" is not kept constant with rising of the image angle but is made to increase steadily. It is to be observed that the diameter of the entrance opening along the meridional section is measured in a plane normal to the optical axis. Especially favourable conditions for a small decrease of light result if the beams, incident at a large angle to the optical axis, are subjected to strong refraction on passing the group of diverging components on the object side. In accordance with the invention, this group is thus composed of at least three diverging components which are separated by air with the result that for inclined incident beams of light the mentioned effective section can become considerably larger than for the center of the image. Since the beam width too increases, though considerably less, in the sagittal section, the decrease of light approaches the second power of the cosine of the image angle.

Moreover a satisfactory character, i. e. a more straight reach of the curve of the error of spherical aberration can be obtained if in accordance with the desired ratio of aperture the distance between the two outer convex surfaces directed towards the object and image side respectively of said converging components is made greater than $0.20 \cdot f$ and smaller than $1.5 \cdot f$, $f$ being the focal length of the objective. With a smaller ratio of aperture of the objective or with lesser requirement in reducing the zonal error of spherical aberration the lower limiting value will suffice. With an increasing of the aperture ratio or high demands to reduction of the zonal error of spherical aberration the upper limit is decisive.

In order to obtain a strong refractive power for the inclined beams in the diverging lens group it has also proved to be of advantage to choose the sum of the axial thickness of the air spaces between the negative lenses on the object side larger than 0.24 times the total focal length of the objective.

The figure of the illustration shows an example of an objective in accordance with the invention. Two compound positive cemented components D and E are flanked by three diverging components A—B—C on the object side and by the diverging component F on the image side. The lens components A—B—C are menisci convex toward the object. The lens component F is a meniscus lens convex toward the image. The sum of the axial thickness of the two air spaces between the components A, B, C is $0.39 f$. In addition, the figure of the illustration shows the increase of the light bundle cross section $E_0$ for an angle of incidence to the optical axis of 0° in comparison to a light bundle cross section $E_w$ for an angle of 60°. In both cases the free opening of the iris diaphragm B1 is completely filled with light.

In the example is the diameter of cross section $$E_0 = \frac{\text{focal length}}{\text{aperture number}} = \frac{100}{5.6} = 17.9 \text{ mm.}$$

For an image angle of ±60° size of the diameter of the cross section measured in a plane normal to the optical axis is $E_w = 40.0$ mm. The diameter of the iris diaphragm is $\phi = 23.6$ mm. Therewith $$\frac{E_0}{\phi} = \frac{17.9}{23.6} = 0.76$$

whereas $$\frac{E_w}{\phi} = \frac{40.0}{23.6} = 1.70$$

For angles smaller than 60° the quotient accordingly amounts between 0.76 and 1.70. In accordance with the Lambert's $\cos^4 w$ law preferably evident with an objective with front diaphragm the corresponding cross section would remain $E_0 = E_w$, and accordingly also the quotient $$\frac{E_0}{\phi} = \frac{E_w}{\phi} = 1$$

The cemented surfaces in the examples may also remain uncemented and be separated from each other by air spaces and have differing curvatures so far as no total internal reflection is to be feared of the rays of light required for producing the image, and provided that such an air layer does not substantially affect the performance of the objective. If a component is subdivided in this manner it is to be regarded for the purpose of this specification as a single component.

The following is a list of the optical data of the illustrated objective.

Example

[Focal length f = 100 mm.   Aperture ratio 1:5.6   Image angle about ±60°]

|    | r           | d         | $n_d$  | V    |
|----|-------------|-----------|--------|------|
| L₁ | r₁ = +112.0 | d₁ = 3.0  | 1.5038 | 66.7 |
|    | r₂ = + 68.41 | l₁ = 21.7 |        |      |
| L₂ | r₃ = + 97.30 | d₂ = 8.0  | 1.4870 | 70.0 |
|    | r₄ = + 58.45 | l₂ = 17.2 |        |      |
| L₃ | r₅ = + 95.0 | d₃ = 8.0  | 1.4339 | 95.2 |
|    | r₆ = + 52.59 | l₃ = 32.48 |       |      |
| L₄ | r₇ = + 58.39 | d₄ = 32.0 | 1.7215 | 29.3 |
| L₅ | r₈ = + 95.56 | d₅ = 11.6 | 1.6240 | 49.7 |
|    | r₉ = −195.45 | l₄ = 4.8  |        |      |
| L₆ | r₁₀ = −222.50 | d₆ = 5.5 | 1.5731 | 41.3 |
| L₇ | r₁₁ = + 88.50 | d₇ = 20.6 | 1.6240 | 49.7 |
|    | r₁₂ = − 25.77 |          |        |      |
| L₈ | r₁₃ = − 58.08 | d₈ = 19.8 | 1.7181 | 47.0 |
|    |             | l₅ = 37.88 |        |      |
| L₉ | r₁₄ = − 40.63 | d₉ = 12.3 | 1.6127 | 56.3 |
|    | r₁₅ = −114.61 |          |        |      |

Iris diaphragm diameter φ = 23.6 mm.
L₁ to L₉ are the lens elements forming the lens components (A, B, C, D, E, F)
r₁ to r₁₅ = the radii of the lens surfaces numbered in the direction of the incident light
d₁ to d₉ = the axial thicknesses of the lens elements
l₁ to l₅ = the axial air separation between the lens components
$n_d$ = the index of refraction of the lens materials of the several lens elements
V = the corresponding dispersion ratio or Abbe number of the respective lens materials.

I claim:

1. A photographic wide angle objective having an aperture ratio of at least 1:6.3 and, for purposes of distortion-free correction for spherical aberration with image angles of at least 120° being composed of two distinctly unsymmetrical lens groups including between them a diaphragm the front group facing the object consisting of an inner converging lens component adjacent the said diaphragm and, separated therefrom and from one another, of at least three meniscus shaped diverging lens members, the rear group facing the image consisting of another inner converging lens component adjacent the said diaphragm, and, separated from said component, of one diverging meniscus shaped lens member, all air spaces between the lens components and members in each group being meniscus shaped air lenses, and the distance between the two outer convex surfaces directed towards the object and image side respectively of said components being greater than 0.20·f and smaller than 1.5·f, f being the focal length of the objective.

2. In a wide angle objective according to claim 1, the diverging lens member on the image side being strongly bent toward the image and besides more strongly bent than each of the diverging lens members on the object side are bent toward the object.

3. In a wide angle objective according to claim 1, the sum of axial thicknesses between the diverging lens members in the front lens group facing the object being greater than 0.24·f, f being the focal length of the objective.

References Cited in the file of this patent

UNITED STATES PATENTS

| | | |
|---|---|---|
| 895,045 | Rudolph | Aug. 4, 1908 |
| 2,126,126 | Merte | Aug. 9, 1938 |
| 2,146,662 | Van Albada | Feb. 7, 1939 |
| 2,341,385 | Kingslake | Feb. 8, 1944 |
| 2,516,724 | Roosinov | July 25, 1950 |
| 2,649,022 | Angenieux | Aug. 18, 1953 |

FOREIGN PATENTS

| | | |
|---|---|---|
| 620,538 | Germany | Oct. 23, 1935 |
| 564,306 | Great Britain | Sept. 21, 1944 |
| 680,185 | Great Britain | Oct. 1, 1952 |

UNITED STATES PATENT OFFICE
CERTIFICATE OF CORRECTION

Patent No. 2,730,016                                             January 10, 1956

Ludwig Bertele

It is hereby certified that error appears in the printed specification of the above numbered patent requiring correction and that the said Letters Patent should read as corrected below.

Column 3, line 39, for "of at least $120°$" read -- up to $120°$ --.

Signed and sealed this 29th day of March 1960.

(SEAL)
Attest:

KARL H. AXLINE
Attesting Officer

ROBERT C. WATSON
Commissioner of Patents